United States Patent [19]

Gardner et al.

[11] 4,376,698

[45] Mar. 15, 1983

[54] CATALYTIC HYDRODESULFURIZATION OF ORGANIC COMPOUNDS EMPLOYING PROMOTED ZINC TITANATE

[75] Inventors: Lloyd E. Gardner; Floyd E. Farha, Jr.; Alan D. Eastman, all of Bartlesville, Okla.

[73] Assignee: Phillips Petroleum Company, Bartlesville, Okla.

[21] Appl. No.: 259,283

[22] Filed: Apr. 30, 1981

Related U.S. Application Data

[63] Continuation of Ser. No. 125,429, Feb. 18, 1980, abandoned.

[51] Int. Cl.$^3$ .............................................. C10G 45/04
[52] U.S. Cl. ................................ 208/215; 208/216 R; 208/217
[58] Field of Search ................... 208/213, 215, 216 R, 208/217

[56] References Cited

U.S. PATENT DOCUMENTS

| | | | |
|---|---|---|---|
| 2,279,198 | 4/1942 | Huppke | 208/134 |
| 2,298,347 | 10/1942 | Corson | 208/215 |
| 2,393,288 | 1/1946 | Byrns | 208/46 |
| 2,591,525 | 4/1952 | Engel | 208/214 |
| 3,105,811 | 10/1963 | Engel | 208/60 |
| 4,029,599 | 6/1977 | Regels | 208/216 |
| 4,128,505 | 12/1978 | Mikovsky | 208/216 R |
| 4,144,277 | 3/1979 | Walker | 260/666 A |
| 4,155,835 | 5/1979 | Antal | 208/89 |
| 4,287,050 | 9/1981 | Eastman et al. | 208/217 |
| 4,313,820 | 2/1982 | Farha et al. | 208/215 |

FOREIGN PATENT DOCUMENTS 828934 2/1960 United Kingdom .

OTHER PUBLICATIONS

Berkman et al., *Catalysis,* Reinhold Pub. Corp., N.Y., (1940), p. 925.
Carlile et al., *J. Soc. Chem. Ind.,* vol. 57 (Oct. 1938), pp. 347–349.

*Primary Examiner*—Brian E. Hearn

[57] ABSTRACT

The catalytic hydrodesulfurization of organic compounds containing sulfur is carried out in the presence of a catalyst composition comprising zinc titanate and at least one promoter selected from the group consisting of vanadium, chromium, cobalt, nickel, molybdenum, tungsten, rhenium, platinum, palladium, rhodium, ruthenium, and compounds thereof.

25 Claims, No Drawings

CATALYTIC HYDRODESULFURIZATION OF ORGANIC COMPOUNDS EMPLOYING PROMOTED ZINC TITANATE

This application is a continuation of application Ser. No. 125,429, filed Feb. 18, 1980, now abandoned.

This invention relates to an improved catalytic process for the hydrodesulfurization (HDS) of organic sulfur compounds or hydrodenitrogenation (HDN) of organic nitrogen compounds, and a catalyst therefor.

Hydrodesulfurization is a process intended primarily to convert the sulfur in organic sulfur compounds to hydrogen sulfide. Hydrodenitrogenation is a process intended primarily to convert the nitrogen in organic nitrogen compounds to ammonia. Hydrodesulfurization and hydrodenitrogenation will generally occur at the same time under similar process conditions if both organic sulfur compounds and organic nitrogen compounds are present in the feed stream. The hydrogen sulfide and/or ammonia can be removed from the feed stream after the hydrodesulfurization and/or hydrodenitrogenation process. Hydrodesulfurization and hydrodenitrogenation are processes which are typically utilized to remove sulfur and nitrogen from a hydrocarbon-containing feedstock which also contains organic sulfur compounds and/or organic nitrogen compounds to produce fuels which, when burned, will meet environmental standards. The processes may be applied to feed streams other than hydrocarbon-containing feeds if organic sulfur compounds and/or organic nitrogen compounds are present and the removal of sulfur and/or nitrogen is desired.

The earliest hydrodesulfurization and/or hydrodenitrogenation catalysts were bauxite and Fuller's earth. Later, catalysts containing cobalt molybdate on alumina and nickel tungstate on alumina substantially replaced the earlier catalyst and these catalysts are still used very extensively.

Both hydrodesulfurization and hydrodenitrogenation processes require substantial energy because of the elevated temperatures required and also require substantial volumes of hydrogen which is expensive. Hydrogen is required to convert the sulfur in organic sulfur compounds to hydrogen sulfide and to convert the nitrogen in organic nitrogen compounds to ammonia. If the feed stream containing the organic sulfur compounds and/or organic nitrogen compounds also contains aromatics, substantial hydrogen may be consumed in hydrogenating aromatics which is undesirable. Thus, a good hydrodesulfurization or hydrodenitrogenation catalyst is one which shows substantial activity at lower temperatures so as to require less energy and also exhibits good selectivity for the consumption of hydrogen so as to reduce the hydrogenation of aromatics if aromatics are present in the feed stream which contains the organic sulfur compounds and/or organic nitrogen compounds. The reduced hydrogenation of aromatics results in a lower consumption of hydrogen and a higher quality desulfurized and/or denitrogenized aromatic containing feedstock.

It is thus an object of this invention to provide an improved hydrodesulfurization and/or hydrodenitrogenation catalyst which exhibits high activity and good selectivity to thus provide an improved process for the hydrodesulfurization of organic sulfur compounds or hydrodenitrogenation of organic nitrogen compounds.

In accordance with the present invention, a catalyst composition comprising zinc, titanium and a promoter is utilized as a catalyst in a hydrodesulfurization process and/or hydrodenitrogenation process. The promoter is at least one member selected from the group consisting of vanadium, chromium, cobalt, nickel, molybdenum, tungsten, rhenium, platinum, palladium, rhodium, ruthenium and, compounds thereof. The hydrodesulfurization and/or hydrodenitrogenation process is carried out under suitable conditions. The catalyst composition exhibits substantial activity for hydrodesulfurization and/or hydrodenitrogenation and also exhibits improved selectivity for the consumption of hydrogen over the conventional cobalt molybdate on alumina catalyst. This results in a decreased hydrogenation of aromatics, where aromatics are present, which reduces the volume of hydrogen required by the hydrodesulfurization and/or hydrodenitrogenation process.

The hydrodesulfurization and/or hydrodenitrogenation process is preferably carried out in cycles comprising a reaction period and a regeneration period for the catalyst. The reaction period comprises contacting a feedstock which contains organic sulfur compounds and/or organic nitrogen compounds with the catalyst to thereby convert the sulfur in organic sulfur compounds in the feedstock to hydrogen sulfide and also convert the nitrogen in organic nitrogen compounds to ammonia. After the reaction period, a molecular oxygen-containing gas is passed in contact with the catalyst to regenerate the catalyst by burning off carbonaceous materials which may have formed on the catalyst.

Other objects and advantages of the invention will be apparent from the foregoing brief description of the invention and the appended claims, as well as the detailed description of the invention which follows.

Any suitable organic sulfur compound may be hydrodesulfurized in accordance with the present invention. Suitable organic sulfur compounds include sulfides, disulfides, mercaptans, thiophenes, benzothiophenes, dibenzothiophenes and the like and mixtures of two or more thereof.

Any suitable organic nitrogen compound may be hydrodenitrogenized in accordance with the present invention. Suitable organic nitrogen compounds include amines, diamines, pyridines, quinolines, porphyrins, benzoquinolines and the like and mixtures of two or more thereof.

Organic sulfur compounds and/or organic nitrogen compounds contained in any suitable gaseous stream may be hydrodesulfurized and/or hydrodenitrogenized in accordance with the present invention. Suitable gaseous streams include light hydrocarbons such as methane, ethane, ethylene and natural gas, gases such as hydrogen and nitrogen, gaseous oxides of carbon, steam, and the inert gases such as helium and argon.

The invention is particularly directed to hydrocarbon-containing feed streams which also contain organic sulfur compounds and/or organic nitrogen compounds. Suitable hydrocarbon-containing feeds include not only those feeds previously mentioned but also petroleum products and products from extraction and/or liquefaction of coal and lignite, products from tar sands, products from shale oil and similar products. Suitable hydrocarbons include naphtha, distillates, gas oil having a boiling range from about 205° to about 538° C., topped crude having a boiling range in excess of about 343° C. and residuum.

The catalyst employed in the process of the present invention is a composition comprising zinc, titanium and a promoter. At least one member of the promoter is selected from the group consisting of vanadium, chromium, cobalt, nickel, molybdenum, tungsten, rhenium, platinum, palladium, rhodium, ruthenium, and compounds thereof. The promoting elements are generally present on the catalyst as the oxide or the sulfide except for platinum which will generally be present as the element. The zinc and titanium are generally present as zinc titanate.

The zinc titanate base of the catalyst composition may be prepared by intimately mixing suitable portions of zinc oxide and titanium dioxide, preferably in a liquid such as water, and calcining the resulting mixture in a gas containing molecular oxygen at a temperature in the range of about 650° C. to about 1050° C., preferably in the range of about 675° C. to about 975° C. A calcining temperature in the range of about 800° C. to about 850° C. is most preferred because the surface area of the catalyst is maximized in this temperature range thus producing a more active catalyst. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active catalyst. Preferably the titanium dioxide has an average particle size of less than 100 millimicrons and more preferably less than 30 millimicrons. Flame hydrolyzed titanium dioxide has extremely small particle size and is particularly preferred in preparing the catalyst. The atomic ratio of zinc to titanium can be any suitable ratio. The atomic ratio of zinc to titanium will generally lie in the range of about 1:1 to about 3:1 and will preferably lie in the range of about 1.8:1 to about 2.2:1 because the activity of the catalyst is greatest for atomic ratios of zinc to titanium in this range. The term "zinc titanate" is used regardless of the atomic ratio of zinc to titanium.

The zinc titanate base of the catalyst composition may also be prepared by coprecipitation from aqueous solutions of a zinc compound and a titanium compound. The aqueous solutions are mixed together and the hydroxides are precipitated by the addition of an alkali metal hydroxide. The precipitate is then washed, dried and calcined, as described in the preceding paragraph, to form zinc titanate. This method of preparation is less preferred than the mixing method because the zinc titanate prepared by the coprecipitation method is softer than the zinc titanate prepared by the mixing method.

The promoter, at least one member of which is selected from the group consisting of vanadium, chromium, cobalt, nickel, molybdenum, tungsten, rhenium, platinum, palladium, rhodium, ruthenium and compounds thereof, is generally present on the catalyst in the oxide or sulfide form except for platinum which will generally be present in the elemental form. The promoter can be added to the zinc titanate by any method known in the art. The promoter can be added to the zinc titanate as powdered oxide and dispersed by any method known in the art such as rolling, shaking or stirring. For ease of preparation, the preferred method of adding the promoter is by impregnating the preformed zinc titanate with a solution of a compound of the promoting element that becomes converted to the oxide during the subsequent preparation of the catalyst. The impregnated catalyst is dried to remove solvent and is then heated in air at a temperature in the range of about 500° C. to about 650° C., preferably about 540° C. If more than one of the promoting elements is to be used in the catalyst composition, the catalyst composition is preferably dried and calcined after each addition of a promoting element.

The concentration of the promoter can be any suitable concentration. The concentration of the total promoter, expressed as an element, will generally range from about 0.1 to about 24 weight percent based on the weight of the catalyst composition. The concentration of the vanadium, chromium, cobalt, nickel, molybdenum, or tungsten as individual promoting elements, expressed as an element, if present, will preferably be in the range of about 0.1 to about 16 weight percent based on the weight of the catalyst composition and will more preferably be in the range of about 1.6 to about 8 weight percent. The concentration of rhenium, palladium, rhodium, ruthenium or platinum as individual promoting elements, expressed as the element, if present, will preferably be in the range of about 0.2 to about 1.6 weight percent.

Either the elemental form of the promoters or any suitable compound of the promoters may be used to form the catalyst composition.

Vanadium compounds suitable for use as a promoter include di-, tri-, tetra-, and pentavalent vanadium oxides, vanadium (III) sulfide, vanadium (IV) oxide sulfate, ammonium metavanadate, sodium metavanadate, and the like and mixtures of any two or more thereof.

Chromium compounds suitable for use as a promoter include ammonium chromate and ammonium dichromate, chromic nitrate, chromium (III) oxide, chromium (VI) oxide, chromic sulfate, potassium chromate and potassium dichromate, chromic acetate, and the like and mixtures of any two or more thereof.

Cobalt compounds suitable for use as a promoter include cobalt acetate, cobalt carbonate, cobalt nitrate, cobalt oxide, cobalt sulfate, cobalt thiocyanate, and the like and mixtures of any two or more thereof.

Nickel compounds suitable for use as a promoter include nickel acetate, nickel carbonate, nickel nitrate, nickel oxide, nickel sulfate, ammonium nickel sulfate, nickel sulfamate, and the like and mixtures of any two or more thereof.

Molybdenum compounds suitable for use as a promoter include ammonium molybdate, ammonium heptamolybdate, sodium molybdate, potassium molybdate, molybdenum oxides such as molybdenum (IV) oxide and molybdenum (VI) oxide, molybdenum sulfide, and the like and mixtures of any two or more thereof.

Tungsten compounds suitable for use as a promoter include ammonium tungstates such as ammonium metatungstate and ammonium paratungstate, tungsten oxides such as tungsten (IV) oxide and tungsten (VI) oxide, tungsten sulfides such as tungsten (IV) sulfide and tungsten (VI) sulfide, heteropoly acids such as tungstophosphoric acid and tungstosilicic acid, and the like and mixtures of any two or more thereof.

Rhenium compounds suitable for use as a promoter include perrhenic acid, ammonium perrhenate, rhenium oxides such as rhenium (VI) oxide and rhenium (VII) oxide, rhenium sulfide, and the like and mixtures of any two or more thereof.

Platinum compounds suitable for use as a promoter include dihydrogen hexachloroplatinate, diamineplatinum (II) nitrate, tetraamineplatinum (II) nitrate, and the like and mixtures of any two or more thereof.

Ruthenium, rhodium, and palladium nitrates are a suitable form for the addition of these elements as catalyst promoters.

Halogen-containing compounds of the promoting elements can be used as promoters. However, the user should be aware of the possibility of corrosion caused by their presence.

A combination of cobalt and molybdenum is presently the most preferred promoter because of the improved selectivity of a catalyst composition employing this promoter. Especially preferred are catalyst compositions in which the cobalt:molybdenum atomic ratio is in the range of about 0.6 to about 0.8.

The surface area of the catalyst increases as the catalyst becomes sulfided and reaches a maximum when the catalyst is completely sulfided. The catalyst may become sulfided during the hydrodesulfurization process or may be presulfided. The catalyst is preferably presulfided even if the catalyst is to be used only for hydrodenitrogenation. The presulfiding of the catalyst is preferred before the catalyst is initially used and after each regeneration of the catalyst. Preferably, the catalyst is presulfided in two steps. The catalyst is first treated with a mixture of hydrogen sulfide in hydrogen at a temperature in the range of about 175° C. to about 225° C., preferably about 205° C. The temperature in the catalyst composition will rise during this first presulfiding step and the first presulfiding step is continued until the temperature rise in the catalyst has substantially stopped or until hydrogen sulfide is detected in the effluent flowing from the reactor. The mixture of hydrogen sulfide and hydrogen preferably contains in the range of about 5 to about 20 mole percent hydrogen sulfide, preferably about 10 mole percent hydrogen sulfide.

The second step in the presulfiding process consists of repeating the first step at a temperature in the range of about 350° C. to about 400° C., preferably about 370° C. It is noted that other mixtures containing hydrogen sulfide may be utilized to presulfide the catalyst. Also the use of hydrogen sulfide is not required. In a commercial operation, it is common to utilize a light naphtha containing sulfur to presulfide the catalyst.

The pre-sulfided form is the most active state of the catalyst. However, since the zinc titanate base of the catalyst becomes sulfided up to about 25 weight percent of the catalyst, the presulfiding time as described above might be too lengthy to be practical in a commercial operation. An alternative method is sulfiding with the feed to be processed at mild conditions where coke formation on the catalyst is minimal. The feed is preferably recycled until the desired sulfur content is reached, and the gaseous effluent containing hydrogen sulfide is also recycled. When the desired catalyst activity is reached the recycle operation is discontinued.

The process of this invention can be carried out by means of any apparatus whereby there is achieved a contact with the catalyst of the organic compounds to be hydrodesulfurized and/or hydrodenitrogenized. The process is in no way limited to the use of a particular apparatus. The process of this invention can be carried out using a fixed catalyst bed, fluidized catalyst bed, or moving catalyst bed. Presently preferred is a fixed catalyst bed.

In order to avoid any casual mixing of the feed stream containing the organic sulfur compound and/or organic nitrogen compound and the oxygen-containing fluid utilized in the regeneration step, provision is preferably made for terminating the flow of feed to the reactor and subsequently injecting an inert purging fluid such as nitrogen, carbon dioxide or steam. Any suitable purge time can be utilized. The purge duration will generally be of sufficient duration to remove all hydrocarbons and hydrogen from the system. Any suitable flow rate of the purge gas may be utilized. Presently preferred is a purge fluid flow rate in the range of about 800 GHSV to about 1200 GHSV.

Any suitable temperature for hydrodesulfurization and/or hydrodenitrogenation of the organic sulfur compounds and/or organic nitrogen compounds over the catalyst composition of the present invention can be utilized. The temperature will generally be in a range of about 205° C. to about 538° C. and will more preferably be in the range of about 316° C. to about 427° C. for the hydrodesulfurization process and/or the hydrodenitrogenation process.

Any suitable pressure for the hydrodesulfurization and/or hydrodenitrogenation of the organic sulfur compounds and/or organic nitrogen compounds over the catalyst composition of the present invention can be utilized. In general, the pressure will be in the range of about 200 to about 3000 psig total system pressure for the hydrodesulfurization process and/or the hydrodenitrogenation process. The total system pressure is the sum of the partial pressure of the feedstock plus the partial pressure of the added hydrogen. Preferably the total system pressure will range from about 400 to about 1000 psig for the hydrodesulfurization process and/or the hydrodenitrogenation process.

Any suitable quantity of hydrogen can be added to the hydrodesulfurization and/or hydrodenitrogenation process. The quantity of hydrogen used to contact the feedstock containing the organic compounds being hydrodesulfurized and/or hydrodenitrogenized will be in the range from about 100 to about 10,000 SCF/bbl and will more preferably be in the range from about 500 to about 3000 SCF/bbl.

Any suitable residence time for the feedstock in the presence of the catalyst composition of the present invention can be utilized. In general, the residence time in terms of the volumes of liquid per volume of catalyst per hour (LHSV) can range from about 0.1 to about 20 and will more preferably range from about 1 to about 5 for the hydrodesulfurization process and/or the hydrodenitrogenation process.

To maintain the activity of the catalyst, the temperature of the hydrodesulfurization and/or hydrodenitrogenation process is gradually increased to compensate for loss of catalyst activity due to fouling of the catalyst. When the temperature of the hydrodesulfurization and/or hydrodenitrogenation process cannot conveniently be increased further, the catalyst is typically regenerated by terminating the flow of feed to the reactor and purging with an inert gas such as nitrogen to remove combustibles and then introducing free oxygen-containing fluid to oxidize the carbonaceous deposits which have formed on the catalyst during the hydrodesulfurization and/or hydrodenitrogenation process. The catalyst will generally be utilized for a year or longer before being regenerated.

The amount of oxygen, from any source, supplied during the regeneration step will be sufficient to remove carbonaceous materials from the catalyst and will preferably be in 1–5 mole percent concentration. The regeneration step is conducted at generally the same pressure recited for the hydrodesulfurization and/or hydrodenitrogenation step but can be carried out at lower pressure if desired. The temperature for the regeneration step is preferably maintained in the range of about 425° C. to about 540° C., although it can be as high as 620° C. If the hydrodesulfurization and/or hydrodenitrogenation process has been proceeding at a temperature lower than 425° C., the temperature of the catalyst should be increased to about 425° C. prior to the start of the regeneration of the catalyst in order to remove any carbonaceous deposits on the catalyst within a reasonable time. Regeneration will also partially convert the sulfided catalyst to the oxide form and the pre-sulfiding step should be repeated.

The following example is presented in further illustration of the invention.

EXAMPLE

Preparation of Catalysts

Zinc titanate was prepared by combining 162.8 g (2 moles) of Mallinckrodt zinc oxide with 79.9 g (one mole) of Cab-O-Ti titanium dioxide in 1200 ml of water and mixing for 10 minutes in a blender. The resulting slurry was dried in an oven at 105° C. and then calcined by heating in air at 816° C. for three hours. After cooling, the calcined solid was crushed and screened. A $-16+40$ mesh portion of the thus screened catalyst, designated catalyst A, was reserved for testing as made and was also utilized in the preparation of catalyst B, C, E-H, and J-Q. The atomic ratio of zinc to titanium in catalyst A, B, C, E-H and J-Q was 2.00:1.

Zinc titanate was also prepared by mixing 175.4 g (1.8 mole) of powered zinc sulfide and 79.9 g (1.0 mole) of Degussa flame hydrolyzed titanium dioxide in water for about 10 minutes. The resulting mixture was dried in an oven at 120° C. to remove the water and was then calcined in air for 4 hours at 815° C. After cooling, the resultant zinc titanate was crushed and a $-16+40$ mesh portion was separated by screening and used in the preparation of catalyst D and I. The atomic ratio of zinc to titanium in catalyst D and I was 1.8:1.

The general method for preparing catalyst B-Q was as follows. A weighed portion of previously dried zinc titanate having a known pore volume was covered with a solution (generally aqueous) of known concentration of the promoting element. After standing one hour at 25° C. temperature, excess solution was removed by decanting or filtering and the wet catalyst was dried, with occasional stirring, in an oven, on a hot plate, or under a heat lamp. The dried catalyst was calcined in air in a muffle furnace for 3-4 hours at 538° C., cooled in a desiccator, and reweighed. The quantity of promoter added by this procedure was assumed to be calculable from the volume of promoter solution contained in the pores of the zinc titanate, i.e., its pore volume. Occasionally this quantity was checked by observing the gain in weight of the catalyst made as described, but this gain was not considered to provide a definitive value of concentration. The finished catalysts were chemically analyzed for promoter concentration and surface area. To add more than one promoter, the entire procedure previously described was repeated for each impregnation.

The concentration of promoter solution used to impregnate zinc titanate for a desired promoter level was calculated from the formula $$\text{Promoter Compound (g)} = \frac{\text{Formula wt. of compound}}{(n)\ (\text{at. wt.})} \times \frac{\text{Vol. solution}}{\text{pore vol.}} \times \frac{\text{Desired Conc. of promoter, \%}}{100}$$

where n=number of atoms of promoter element per molecule of promoter compound. To illustrate, to prepare a catalyst containing 8.0 weight percent molybdenum on zinc titanate that has 0.8 cc/g pore volume, using ammonium heptamolybdate tetrahydrate as the source of molybdenum, $$\frac{1235.95}{7 \times 95.94} \times \frac{100}{0.80} \times \frac{8.0}{100} =$$

1840g $(NH_4)_6Mo_7O_{24}\cdot 4H_2O$/100 ml solution

The composition of catalyst B-Q and the surface area of catalyst B-Q, if measured, are summarized in Table I. In every case zinc titanate comprises the remainder of the analysis.

TABLE I

| Catalyst | Promoters, Wt. % | Surface Area, $m^2g^{-1}$ |
|---|---|---|
| B | 13.0 $MoO_3$ | 5.1 |
| C | 2.6 $Re_2O_7$ | — |
| D | 2.6 $Re_2O_7$ | — |
| E | 10.7 $V_2O_5$ | — |
| F | 10.2 CoO | — |
| G | 4.0 NiO, 13.0 $MoO_3$ | 4.3 |
| H | 4.0 NiO, 13.0 $MoO_3$ | 6.0 |
| I | 3.4 CoO, 14.7 $MoO_3$ | 8.6 |
| J | 4.2 CoO, 9.63 $MoO_3$ | 12.1 |
| K | 2.8 CoO, 7.95 $MoO_3$ | 5.9 |
| L | 5.21 CoO, 13.35 $MoO_3$ | 6.5 |
| M | 0.38 CoO, 0.87 $MoO_3$ | 6.4 |
| N | 10.7 $V_2O_5$, 4.5 $MoO_3$ | — |
| O | 7.6 NiO, 24.0 $WO_3$ | — |
| P | 5.9 $Cr_2O_3$ | — |
| Q | 1.0 Pt, 3.5 CoO, 12.5 $MoO_3$ | — |

The promoters were added as aqueous solutions of the following salts: Molybdenum as $(NH_4)_6Mo_7O_{24}\cdot 4H_2O$, rhenium as $NH_4ReO_4$, vanadium as $NH_4VO_3$, cobalt as $Co(NO_3)_2\cdot 6H_2O$, nickel as $Ni(NO_3)_2\cdot 6H_2O$, tungsten as $(NH_4)_2W_4O_{13}\cdot 8H_2O$, chromium as $Cr(NO_3)_3\cdot 9H_2O$, and platinum as $H_2PtCl_6$.

Testing Procedure

All catalysts were evaluated in an automated test unit capable of testing six catalysts simultaneously. Six reactors, 1" o.d. ×0.813" i.d. and made of 316 stainless steel, were disposed symmetrically in a single furnace. Each of the six reactors was operated with a fixed catalyst bed in down-flow mode. Oil preheat lines ran upflow through the furnace, entering the top of the respective reactor where the oil was mixed with added hydrogen. Conditions in the reactors were mixed phase, i.e., trickle bed process. Runs were made with 25 cc of catalyst, or with 5 cc of catalyst diluted with 20 cc of inert diluent (corumdum). Contact time of reactants with catalyst, in terms of the volume of oil per volume of catalyst per hour (LHSV), was varied by either varying the oil pump settings or by the use of diluted catalyst.

The procedures generally followed to evaluate a catalyst was to make a temperature survey. After a "break-in" period during which the catalyst was sulfided with feed or with a hydrogen sulfide-hydrogen mixture (the latter being preferred), the catalyst was utilized in the temperature range 316°–427° C. (600°–800° F.). The sequence of tests frequently used was 750° F., 800° F., 600° F., 700° F., and 750° F. Comparison of the first and last tests indicated if any changes in activity occurred during the survey. Catalyst activities were then compared using a temperature versus hydrodesulfurization-hydrodenitrogenation correlation. During a run liquid products were removed from a high pressure separator. The liquid products were analyzed for carbon, hydrogen, nitrogen, and sulfur and for hydrocarbon type. At the end of a run or when a unit was shut down overnight, the reactor was purged for about an hour with hydrogen after pumping of liquid feed had been stopped. Carbon deposited on used catalyst was determined by analysis of a representative sample after all catalyst had been removed from the reactor. Catalyst regeneration was normally done by calcining the material in air in a muffle furnace at about 427°–538° C. for 1 to 2 hours. Usually at least two sets of runs were made on each catalyst to determine any effects of regeneration.

Two different methods were used to prepare the catalyst for testing, referred to as the "break-in" period above. Both involved sulfiding the catalyst. One sulfiding method utilized operation at reaction conditions with a sulfur-containing feed for a period of time sufficient to sulfide the catalyst with hydrogen sulfide derived from the feed. The other sulfiding method involved treating the catalyst with 5–10 mole percent hydrogen sulfide in hydrogen at atmospheric pressure. Catalyst temperature between 315°–400° C. was maintained during the sulfiding period when using the first method. As described above, presulfiding with $H_2S/H_2$ mixture was done in two steps: first at 175°–225° C., then at 350°–400° C.

In general, process conditions used to evaluate the hydrodesulfurization activity of these catalysts included 0–1200 psig pressure, 260°–427° C. temperature, liquid feed rates of 0.5–10 LHSV, and hydrogen feed rate of 5000 SCF/bbl (9.5 mole hydrogen/mole oil).

Results of Catalyst Tests

Catalyst C (rhenium on zinc titanate) and Shell-344 were tested under identical conditions to compare their hydrotreating activity. Shell-344 is a commercially produced cobalt molybdate on alumina hydrotreating catalyst. By analysis, the Shell-344 tested had the following pertinent characteristics: 0.79 g/cc bulk density, 0.5 cc/g pore volume, 186 m²/g surface area, and it contained 2.99 weight percent cobalt as CoO and 14.42 weight percent molybdenum as $MoO_3$. For the comparison, gas oil served as the feedstock. The gas oil contained 0.2 weight percent organic sulfur, 470 ppm organic nitrogen, 68 percent naphthenes plus aromatics, and had a boiling range of 260°–510° C. Tests were made at 427° C., 1000 psig, 1.0 LHSV, and 5000 SCF $H_2$/bbl. Table II summarizes test results.

TABLE II

| Catalyst | C | Shell-344 |
|---|---|---|
| Hydrodesulfurization, wt. % | 92 | 95 |
| Hydrodenitrogenation, wt. % | 65 | 96 |

TABLE II-continued

| Catalyst | C | Shell-344 |
|---|---|---|
| Yield of <260° C., wt. % | 10 | 29 |
| Naphthenes + aromatics, wt. % | 71 | 66 |
| Wt. % H in product | 13.21 | 13.38 |

While catalyst C was substantially inferior for hydrodenitrogenation it was nearly equal for hydrodesulfurization. Catalyst C consumed significantly less hydrogen than the commercial cobalt molybdate on alumina. This is demonstrated by the lower yield of hydrocracked product, by the higher concentration of naphthenes plus aromatics, and by the lower concentration of hydrogen in the liquid product as shown by elemental analysis.

Catalyst H and Shell-344 were tested under identical conditions to hydrotreat a distillate that, by analysis, contained 13.05 weight percent hydrogen, 7700 ppm organic sulfur, 124 ppm organic nitrogen, 31 weight percent aromatics, and a mono/poly aromatics ratio (weight) of 0.9. Tests were made at 1000 psig, 1.0 LHSV, and 5000 SCF $H_2$/bbl. Other conditions and test results are summarized in Table III.

TABLE III

| Catalyst | H | | Shell-344 | |
|---|---|---|---|---|
| Temp., °F. | 725 | 775 | 725 | 775 |
| Hydrodesulfurization, wt. % | 97.5 | 99.2 | 98.7 | 99.0 |
| Hydrodenitrogenation, wt. % | 96.6 | 95.2 | 97.6 | 99.2 |
| Yield of <260° C., wt. % | 8.7 | 13.8 | 21.5 | 25.0 |
| H in product, wt. % | 13.35 | 13.36 | 13.60 | 13.42 |
| S in product, ppm | 190 | 60 | 100 | 80 |
| N in product, ppm | 4 | 6 | 3 | 1 |
| Aromatics, wt. % | 31 | 30 | 26 | 28 |
| Mono/poly aromatics | 2.4 | 2.6 | 5.5 | 5.5 |

At both temperatures the Shell-344 catalyst was generally slightly superior for both hydrodesulfurization and hydrodenitrogenation activity. However, catalyst H consumed less hydrogen as evidenced by the extent of hydrocracking and by the hydrogen content of the product. Additionally, lower hydrogen consumption is deduced from the aromatics content and the production of mono aromatics from poly aromatics.

Table IV summarizes results of runs in which promoted catalysts B, C, D, E, F, G, N, O, P and Q as well as unpromoted catalysts A and A' (different preparations of same catalyst) were used to hydrotreat the feedstock blend. Unpromoted catalyst A' was prepared in the same manner as unpromoted catalyst A. All of the tests were made at 1.0 LHSV with 5000 SCF $H_2$/bbl and were of 30–60 hours duration. With the possible exception of catalysts E and P, each of the promoted zinc titanates was more active for HDS and HDN than catalysts A and A'—the unpromoted zinc titanate. The presence of vanadium in catalyst E is principally of value to regenerate the spent catalyst. Catalyst G, containing both nickel and molybdenum, is superior at any given temperature to any of the singly promoted zinc titanates of Table IV for hydrodesulfurization activity; it is at least equal in hydrodenitrogenation activity to any of the singly promoted catalysts.

TABLE IV

| Run | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Catalyst | A | A | A' | A' | B | B | C | D | E | F | G | N | O | P | Q |
| Pressure, psig | 500 | 500 | 1000 | 500 | 500 | 1000 | 500 | 500 | 500 | 500 | 500 | 500 | 500 | 500 | 500 |
| Wt. % Hydrodesulfurization | | | | | | | | | | | | | | | |
| at 600° F. | | | | | | | 32.8 | 37.5 | | | 57.3 | | | | |
| at 650° F. | 28.0 | 33.3 | 35.1 | 31.9 | 47.2 | 62.3 | 48.0 | 54.7 | 31.5 | 39.7 | 94.3 | 52.1 | 78.7 | 22.2 | 72.0 |
| at 700° F. | 46.7 | | | | 77.8 | 84.4 | 70.1 | 77.6 | 46.6 | 54.8 | 97.3 | 71.2 | 91.2 | 31.9 | 84.0 |
| at 725° F. | | | 51.9 | 44.4 | | | | | | | | | | | |
| at 750° F. | 54.7 | 60.0 | 66.2 | | | 96.5 | 84.3 | 89.7 | 65.8 | 71.2 | 98.7 | 89.6 | 94.7 | 45.8 | 88.0 |
| at 775° F. | 66.7 | 70.7 | 79.2 | 63.9 | 87.5 | 96.2 | | | 68.5 | 82.2 | | 93.6 | 93.3 | 56.9 | 93.3 |
| at 800° F. | | | 83.1 | | | 99.1 | 96.5 | 96.4 | | | 99.5 | | | | |
| Wt. % Hydrodenitrogenation | | | | | | | | | | | | | | | |
| at 600° F. | | | | | | | 79.1 | 78.6 | | | 73.2 | | | | |
| at 650° C. | 73.2 | 61.4 | 85.5 | 63.2 | 71.8 | 93.5 | 86.6 | 87.7 | 57.6 | 70.0 | 94.1 | 77.2 | 79.5 | 57.0 | 74.5 |
| at 700° F. | 78.4 | 71.9 | 81.5 | | | 98.9 | 92.5 | 91.4 | 67.3 | 73.1 | 97.4 | 82.0 | 84.8 | 64.8 | 83.0 |
| at 750° F. | 74.5 | 66.0 | 87.9 | | | 100.0 | 88.2 | 95.2 | 72.1 | 73.0 | 98.0 | 82.9 | 88.4 | 70.3 | 79.7 |
| at 775° F. | 75.8 | 77.1 | 92.7 | | | 97.6 | | | 77.9 | 75.1 | | 87.3 | 77.7 | 70.3 | 77.8 |
| at 800° F. | | | 96.8 | | | 100.0 | 86.6 | 94.1 | | | 96.7 | | | | |
| Catalyst Inspection | | | | | | | | | | | | | | | |
| Carbon after run, wt. % | 0.30 | 0.57 | 0.33 | 0.43 | 0.47 | 0.45 | 0.34 | 0.73 | 0.56 | 0.38 | 0.82 | 0.58 | 0.39 | 0.70 | 0.56 |
| Surface area, m$^2$/g | | | | | | | | | | | | | | | |
| After run | | | | | | | 14.2 | 21.1 | | | 17.6 | | | | |
| After regeneration | | | | 10.5 | | | 6.9 | 7.4 | | | 7.0 | | | | |

*Carbon after regeneration was believed to be zero weight percent.

Table V summarizes results from runs made with five different catalysts—all being cobalt molybdate on zinc titanate but differing in method of zinc titanate preparation or in their concentration of cobalt and molybdenum. These catalysts represent a preferred embodiment of this invention. All runs were made with a refinery blend of 70% straight run distillate and 30% light cycle and 19-21 indicate that the catalyst's activity does not change markedly when the number of process and regeneration cycles is varied. Runs 19-20 compare the effect of varying the length of the process cycles. After 285 hours, compared with 37 hours, the catalyst has lost a little hydrodesulfurization activity—but considerably more hydrodenitrogenation activity.

TABLE V

| Run | 16 | 17 | 18 | 19 | 20 | 21 | 22 | 23 | 24 | 25 | 26 | 27 |
|---|---|---|---|---|---|---|---|---|---|---|---|---|
| Catalyst | H | H | H | I | I | I | I | J | J | K | L | L |
| No. times regenerated | 0 | 2 | 4 | 0 | 1 | 2 | 4 | 2 | 2 | 1 | 0 | 1 |
| Presulfided with | Feed | Feed | Feed | Feed | Feed | Feed | Feed | Feed | Feed | H$_2$S/H$_2$ | H$_2$S/H$_2$ | H$_2$S/H$_2$ |
| Run Conditions | | | | | | | | | | | | |
| Pres., psig | 1000 | 500 | 500 | 500 | 500 | 500 | 500 | 500 | 500 | 500 | 500 | 500 |
| LHSV | 1.0 | 1.0 | 1.0 | 1.0 | 1.0 | 1.0 | 2.5 | 1.0 | 2.5 | 1.0 | 1.0 | 1.0 |
| Reaction time since regenerated, hrs. | 36 | 36 | 36 | 37 | 285 | 48 | 73 | 37 | 99 | 17 | 17 | 17 |
| Wt. % Hydrodesulfurization | | | | | | | | | | | | |
| at 600° F. | | | | | | 61.3 | 68.0 | | 61.3 | 78.4 | 61.5 | 77.7 |
| at 650° F. | 90.0 | 81.9 | 80.0 | 93.3 | 88.0 | 88.0 | 84.0 | 88.0 | 77.3 | 91.7 | 76.3 | 91.7 |
| at 700° F. | 95.3 | 92.4 | 90.7 | 98.7 | 92.9 | 94.7 | 90.7 | 94.7 | 86.7 | 98.3 | 89.3 | 97.9 |
| at 750° F. | 98.6 | 97.4 | 97.3 | 94.7 | 96.8 | 98.7 | 96.0 | 97.3 | 96.0 | 98.9 | 94.0 | 98.5 |
| at 775° F. | 99.2 | 97.4 | 98.9 | 99.6 | 96.5 | 99.2 | | 99.1 | | | | |
| at 800° F. | | | | | | | 97.3 | | 96.0 | 99.4 | 96.9 | 99.2 |
| Wt. % Hydrodenitrogenation | | | | | | | | | | | | |
| at 600° F. | | | | | | 69.9 | 37.8 | | 56.5 | 85.0 | 66.3 | 82.9 |
| at 650° F. | 96.8 | 94.9 | 88.0 | 97.1 | 71.9 | 90.8 | 43.9 | 86.9 | 56.1 | 90.9 | 64.2 | 85.6 |
| at 700° F. | 98.0 | 86.7 | 86.7 | 97.8 | 70.6 | 93.5 | 46.3 | 96.7 | 56.5 | 97.3 | 75.9 | 98.9 |
| at 750° F. | 100.0 | 86.7 | 86.7 | 94.9 | 75.2 | 95.4 | 78.5 | 83.7 | 78.0 | 93.0 | 81.4 | 90.9 |
| at 775° F. | 95.2 | 91.4 | 91.3 | 96.4 | 71.2 | | | 94.8 | | | | |
| at 800° F. | 100.0 | | | | | 90.2 | 77.6 | | 63.1 | 93.0 | 77.5 | 92.5 |
| Catalyst inspection | | | | | | | | | | | | |
| Carbon, wt. % | 0.42 | 0.46 | 0.64 | 0.65 | 0.39 | 0.58 | | 0.84 | | 0.83 | 0.60 | 0.64 |
| Surface area, m$^2$/g | | | | | | | | | | | | |
| After run | | 13.5 | 7.2 | | 10.4 | 9.2 | | 13.2 | | 21.1 | 12.5 | 16.0 |
| After regen. | | 4.9 | 4.3 | | | | | 7.0 | | 8.5 | 5.6 | |

*Carbon after regeneration was believed to be zero weight percent.

oil. The mixture contained 0.75 weight percent organic sulfur, 220 ppm organic nitrogen, and had a boiling range of 99°–382° C. Referring to Table V runs 21-22 and runs 23-24 illustrate the effect of varying contact time (LHSV). The effect of contact time is much larger for hydrodenitrogenation activity than it is for hydrodesulfurization activity. Runs 16-17 compare the effect of two different pressures; at constant temperature the higher pressure always increases both hydrodesulfurization and hydrodenitrogenation. Runs 17-18 and 19-21 compare the effect of varying the number of process and regeneration cycles on a given catalyst. Runs 17-18

It was previously stated that the atomic ratio Co:Mo of about 0.6-0.8:1 was the preferred combination of these promoters on zinc titanate. Table VI tabulates results of runs with catalysts K, L, and M which contained the promoters in approximately this ratio but at widely different promoter concentrations. All runs reported there were made at 500 psig, 1.0 LHSV using the refinery blend feedstock, used to obtain the results set forth in Table V, with catalysts that had been pre-sulfided with a hydrogen sulfide-hydrogen gas mixture in the manner previously described. As shown in Table I, catalysts K, L, and M contained 10.75, 18.56, and 1.25 weight percent of (CoO+MoO3), respectively. The activity of catalysts K and L for HDS and HDN recorded in Table VI shows them to be essentially the same; in contrast catalyst M, which contained much lower concentration of promoter, exhibited substantially less activity.

TABLE VI

| Run | 28 | 29 | 30 | 31 | 32 | 33 | 34 |
|---|---|---|---|---|---|---|---|
| Catalyst | K | K | K | L | L | M | M |
| No. times regenerated | 0 | 1 | 2 | 0 | 1 | 0 | 1 |
| % HDS at 600° F. | 52.7 | 78.4 | 76.7 | 61.5 | 77.7 | 39.2 | 36.1 |
| % HDS at 650 | 71.5 | 91.7 | 89.9 | 76.3 | 91.7 | 56.7 | 49.7 |
| % HDS at 700 | 86.8 | 98.3 | 97.6 | 89.3 | 97.9 | 71.5 | 72.0 |
| % HDS at 750 | 95.7 | 99.6 | 97.2 | 96.1 | 99.3 | 84.9 | 85.2 |
| % HDS at 750 | 92.5 | 98.9 | 98.9 | 94.0 | 99.2 | 85.7 | 82.8 |
| % HDS at 800 | 96.5 | 99.4 | 98.0 | 96.9 | 98.5 | 90.4 | 90.7 |
| % HDN at 600° F. | 69.5 | 85.0 | 87.7 | 66.3 | 82.9 | 57.8 | 73.8 |
| % HDN at 650 | 66.8 | 90.9 | 90.9 | 64.2 | 85.6 | 75.4 | 61.0 |
| % HDN at 700 | 78.6 | 97.3 | 97.9 | 75.9 | 98.9 | 74.9 | 84.5 |
| % HDN at 750 | 88.8 | 98.9 | 100.0 | 84.5 | 98.9 | 74.3 | 93.0 |
| % HDN at 750 | 79.1 | 93.0 | 96.8 | 81.8 | 90.9 | 70.1 | 76.5 |
| % HDN at 800 | 80.7 | 93.0 | 98.9 | 77.5 | 92.5 | 67.9 | 89.8 |
| Catalyst inspection | | | | | | | |
| Carbon, wt. % | 0.46 | 0.83 | 1.01 | 0.60 | 0.64 | 0.66 | 0.44 |
| Surface area, m²/g | | | | | | | |
| After run | 13.3 | 18.7 | 20.1 | 12.5 | 16.0 | 16.2 | 17.2 |
| After regen. | 6.6 | 8.5 | | 5.6 | | 6.2 | |

*Carbon after regeneration was believed to be zero weight percent.

Reasonable variations and modifications are possible within the scope of the disclosure and the appended claims to the invention.

That which is claimed is:

1. A process for the catalytic hydrodesulfurization of an organic sulfur compound comprising the step of contacting said organic sulfur compound under suitable hydrodesulfurization conditions with a catalyst composition comprising zinc, titanium, and at least one promoter selected from the group consisting of vanadium, chromium, cobalt, nickel, molybdenum, tungsten, rhenium, platinum, palladium, rhodium, ruthenium, and compounds thereof, wherein the concentration by weight of said at least one promoter in said catalyst composition is less than the total concentration by weight of said zinc and said titanium in said catalyst composition and wherein said catalyst composition is prepared by calcining a mixture of zinc oxide and titanium dioxide in the presence of molecular oxygen at a temperature in the range of about 650° C. to about 1050° C. to form zinc titanate, adding said at least one promoter to said zinc titanate to form a promoted zinc titanate and completely sulfiding said promoted zinc titanate to form said catalyst composition.

2. A process in accordance with claim 1 wherein said organic sulfur compound is selected from the group comprising sulfides, disulfides, mercaptans, thiophenes, benzothiophenes, dibenzothiophenes and the like and mixtures of any two or more thereof.

3. A process in accordance with claim 1 wherein the atomic ratio of zinc to titanium in said catalyst composition is in the range of about 1:1 to about 3:1.

4. A process in accordance with claim 1 wherein the atomic ratio of zinc to titanium in said catalyst composition is in the range of about 1.8:1 to about 2.2:1.

5. A process in accordance with claim 1 wherein said catalyst composition is calcined in the presence of molecular oxygen at a temperature in the range of about 500° C. to about 650° C. after said at least one promoter has been added to said zinc titanate.

6. A process in accordance with claim 1 wherein the concentration of vanadium, chromium, cobalt, nickel, molybdenum, or tungsten as individual promoters, expressed as an element, if present, is in the range of about 0.1 to about 16 weight percent based on the weight of said catalyst composition and the concentration of rhenium, palladium, rhodium, ruthenium or platinum as individual promoters, expressed as the element, if present, is in the range of about 0.2 to about 1.6 weight percent based on the weight of said catalyst composition.

7. A process in accordance with claim 6 wherein the total concentration of any combination of the group from which said at least one promoter is selected, expressed as an element, is in the range of about 0.1 to about 24 weight percent based on the weight of the catalyst composition.

8. A process in accordance with claim 1 wherein said at least one promoter is cobalt and molybdenum.

9. A process in accordance with claim 8 wherein the cobalt:molybdenum atomic ratio in said catalyst composition is in the range of about 0.6:1 to about 0.8:1.

10. A process in accordance with claim 1 wherein said organic sulfur compound is contained in a fluid feed stream.

11. A process in accordance with claim 10 wherein said fluid feed stream contains aromatic hydrocarbons.

12. A process in accordance with claim 10 wherein said suitable hydrodesulfurization conditions comprise a temperature in the range of about 316° C. to about 427° C., a total system pressure in the range of about 400 psig to about 1000 psig, a hydrogen flow rate in the range of about 500 SCF/bbl to about 3,000 SCF/bbl and a residence time for said fluid feed stream in the presence of said catalyst composition in the range of about 1 to about 5 liquid volumes of said fluid feed stream per volume of said catalyst composition per hour.

13. A process in accordance with claim 10 additionally comprising the steps of:
   discontinuing the flow of said fluid feed stream over said catalyst composition; and
   contacting said catalyst composition, after the flow of said fluid feed stream is discontinued, with a molecular oxygen-containing fluid under suitable regeneration conditions to thereby regenerate said catalyst composition.

14. A process in accordance with claim 13 wherein said suitable regeneration conditions comprise a feed rate of said molecular oxygen-containing fluid suitable to supply sufficient oxygen to remove substantially all of the carbonaceous deposit on said catalyst composition, a temperature in the range of about 425° C. to about 540° C., and a pressure in the range of about 200 psig to about 3,000 psig.

15. A process in accordance with claim 13 additionally comprising the step of purging said catalyst composition with an inert fluid after the step of terminating the flow of said fluid feed stream and before the step of regenerating said catalyst composition.

16. A process in accordance with claim 13 additionally comprising the steps of:
   terminating the flow of said molecular oxygen-containing fluid over said catalyst composition after said catalyst composition is substantially regenerated;

purging said catalyst composition with an inert fluid after the flow of said molecular oxygen-containing fluid is terminated;

terminating the flow of said inert fluid over said catalyst composition after said molecular oxygen-containing fluid is substantially purged from said catalyst composition; and recontacting said catalyst composition with said fluid feed stream after the flow of said inert fluid is terminated.

17. A process in accordance with claim 1 wherein said catalyst composition is completely sulfided by contacting a substantially unsulfided catalyst composition under said suitable hydrodesulfurization conditions with said organic sulfur compound for a length of time sufficient to completely sulfide said catalyst composition.

18. A process in accordance with claim 1 wherein said catalyst composition is completely sulfided by contacting a substantially unsulfided catalyst composition with hydrogen sulfide at a temperature in the range of about 175° C. to about 225° C. until hydrogen sulfide is detected in the effluent flowing from said catalyst composition and then contacting said catalyst composition with hydrogen sulfide at a temperature in the range of about 350° C. to about 400° C. until hydrogen sulfide is detected in the effluent flowing from said catalyst composition.

19. A process for the catalytic hydrodesulfurization of an organic sulfur compound which is contained in a fluid stream which does not contain hydrocarbons which are subject to dehydrogenation, reforming or hydrocracking comprising the step of contacting said fluid stream containing said organic sulfur compound under suitable hydrodesulfurization conditions with a catalyst composition comprising zinc and titanium, wherein said catalyst composition is prepared by calcining a mixture of zinc oxide and titanium dioxide in the presence of molecular oxygen at a temperature in the range of about 650° C. to about 1050° C. to form zinc titanate and completely sulfiding said zinc titanate to form said catalyst composition.

20. A process in accordance with claim 19 wherein said organic sulfur compound is selected from the group comprising sulfides, disulfides, mercaptans, thiophenes, benzothiophenes, dibenzothiophenes and the like and mixtures of any two or more thereof.

21. A process in accordance with claim 19 wherein the atomic ratio of zinc to titanium in said catalyst composition is in the range of about 1:1 to about 3:1.

22. A process in accordance with claim 19 wherein the atomic ratio of zinc to titanium in said catalyst composition is in the range of about 1.8:1 to about 2.2:1.

23. A process in accordance with claim 19 wherein said suitable hydrodesulfurization conditions comprise a temperature in the range of about 316° C. to about 427° C., a total system pressure in the range of about 400 psig to about 1000 psig, a hydrogen flow rate in the range of about 500 SCF/bbl to about 3,000 SCF/bbl and a residence time for said fluid stream in the presence of said catalyst composition in the range of about 1 to about 5 liquid volumes of said fluid stream per volume of said catalyst composition per hour.

24. A process in accordance with claim 19 wherein said catalyst composition is completely sulfided by contacting a substantially unsulfided catalyst composition under said suitable hydrodesulfurization conditions with said organic sulfur compound for a length of time sufficient to completely sulfide said catalyst composition.

25. A process in accordance with claim 19 wherein said catalyst composition is completely sulfided by contacting a substantially unsulfided catalyst composition with hydrogen sulfide at a temperature in the range of about 175° C. to about 225° C. until hydrogen sulfide is detected in the effluent flowing from said catalyst composition and then contacting said catalyst composition with hydrogen sulfide at a temperature in the range of about 350° C. to about 400° C. until hydrogen sulfide is detected in the effluent flowing from said catalyst composition.

* * * * *

UNITED STATES PATENT AND TRADEMARK OFFICE
CERTIFICATE OF CORRECTION

PATENT NO. : 4,376,698

DATED : March 15, 1983

INVENTOR(S) : Lloyd E. Gardner; Floyd E. Farha, Jr; Alan D. Eastman

It is certified that error appears in the above-identified patent and that said Letters Patent is hereby corrected as shown below:

On the title page, Item [75] Inventors: add,

-- Lewis E. Drehman of Bartlesville, Oklahoma --.

Signed and Sealed this

Fifth Day of March 1985

[SEAL]

Attest:

DONALD J. QUIGG

Attesting Officer     Acting Commissioner of Patents and Trademarks